(12) United States Patent
Gille et al.

(10) Patent No.: US 7,021,870 B2
(45) Date of Patent: Apr. 4, 2006

(54) DEVICE FOR THE TRANSPORT OF GRANULAR SOLID PARTICLES WITH A CONTROLLED FLOW RATE

(75) Inventors: Damien Gille, Vienne (FR); Patrice Font, Mornant (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/921,300

(22) Filed: Aug. 19, 2004

(65) Prior Publication Data
US 2005/0058516 A1 Mar. 17, 2005

(30) Foreign Application Priority Data
Aug. 19, 2003 (FR) .................................. 03 10026

(51) Int. Cl.
*B65G 53/04* (2006.01)
(52) U.S. Cl. ........................ 406/93; 406/152; 406/153; 406/194; 406/195
(58) Field of Classification Search ................. 406/93, 406/94, 95, 144, 151, 152, 153, 194, 195
See application file for complete search history.

(56) References Cited

U.S. PATENT DOCUMENTS

| | | | | |
|---|---|---|---|---|
| 1,160,283 A | * | 11/1915 | Hay | ............................ 406/142 |
| 4,327,055 A | * | 4/1982 | Luckenbach et al. | ....... 422/110 |
| 4,525,105 A | | 6/1985 | Jaggi | |
| 4,817,540 A | * | 4/1989 | Razbin et al. | .............. 110/266 |
| 4,854,180 A | | 8/1989 | Mauleon et al. | |
| 5,053,203 A | * | 10/1991 | Mauleon et al. | ............ 422/144 |
| 5,698,642 A | * | 12/1997 | Govoni et al. | ................ 526/65 |
| 6,666,629 B1 | * | 12/2003 | Hirsch et al. | ............... 406/197 |
| 6,764,253 B1 | * | 7/2004 | Pfeiffer | ........................ 406/11 |

FOREIGN PATENT DOCUMENTS

| | | |
|---|---|---|
| EP | 0543100 A | 5/1993 |
| GB | 685365 A | 1/1953 |
| JP | 58017016 | 2/1983 |

OTHER PUBLICATIONS

Patient Abstracts of Japan, Apr. 16, 1983, vol. 0070, no. 92, JP 58017016.

* cited by examiner

*Primary Examiner*—Joe Dillon, Jr.
(74) *Attorney, Agent, or Firm*—Millen, White, Zelano & Branigan, P.C.

(57) ABSTRACT

Process and device for the transport of granular solids with a controlled flow rate, in particular for the transport of catalyst in a hydrocarbon reforming unit. The device comprises a gravity-feed pipe (A) for solid particles in the dense phase, a pneumatic transport pipe (C) in the dilute phase, and an inclined transfer pipe (B) that connects, without a buffer space, the base of the feed pipe to the pneumatic transport pipe, whereby this transfer pipe comprises means (17, 18, 35) for injection of a secondary gas located at the junction between the feed pipe and the transfer pipe.

21 Claims, 3 Drawing Sheets

[Key to Figure 3:]

Débit de particules solides (kg/h) = Flow rate of solid particles (kg/h)

Débit de gaz secondaire (kg/h) = Flow rate of secondary gas (kg/h)

DEVICE FOR THE TRANSPORT OF GRANULAR SOLID PARTICLES WITH A CONTROLLED FLOW RATE

This invention relates to the pneumatic transports of granular solid particles and the installations that implement this type of transport in various fields of the industry, in particular in chemistry and in the petroleum industry.

The invention indicates in particular the field of the devices and installations that are used in the units for catalytic reforming of hydrocarbons for the production of aromatic gasoline making it possible to transport the catalyst from one chamber to another.

PRIOR ART

The techniques for transport of granular particles (particles of a dimension that is close to 1 or several mm) are specific. They are different in particular from techniques for transport of easily fluidizable fine particles, such as catalyst particles of fluid catalytic cracking, whose mean dimension is close to 100 micrometers. The granular particles actually have flow properties that are very different from those of easily fluidizable fine particles.

In the area of catalytic reforming units, devices that make it possible, on the one hand, to collect in a collecting container a catalyst that flows by gravity inside a reaction chamber, and, on the other hand, to propel this catalyst into a pneumatic transport pipe to the upper portion of another reaction chamber are generally used. These devices are also known under the name of "lift pot" in English terminology, which means "elevating pot." The lift pot constitutes a capacity, or a buffer volume, for the accumulation of particles. The pneumatic transport portion, in these devices, generally uses the driving force of a gas, so-called "primary gas," that makes it possible to transport the catalyst in the dilute phase into this primary gas. The evacuation of the catalyst from the collecting container (lift pot) is generally assisted by the injection of a gas, so-called "secondary gas," into this collecting container. This makes it possible to "aerate" the catalyst, i.e., actually to introduce the gas inside this catalyst to facilitate its flow and its evacuation of the container. The secondary gas can also contribute to a certain extent to the dilution and to the driving force of the pneumatic transport.

During the implementation of this type of device, it is important to control the flow of solid particles that are transported into the pneumatic transport pipe. However, such a regulation is not satisfactory if a slight variation of the flow of secondary gas can generate a significant variation of the flow of catalyst. Actually, this tends to promote fluctuations of flow, the former no longer being essentially constant and uniform.

Other systems for transfer of granular solids are also known: the article "L-Valves Characterized for Solids Flow," which means "L-shaped valves that are characterized for the flow of solids" that is obtained from pages 149–156 of the journal "Hydrocarbon Processing" ("Processes for Hydrocarbons"), published in March 1978 (Gulf Publishing Company, Houston, Tex.), describes conditions for implementation of an "L"-shaped valve for the regulation of a flow of solid particles. This type of device consists of an "L"-shaped pipe whose horizontal branch empties into a pneumatic transport pipe. An aeration gas injector is placed at a certain height of the vertical branch of the "L." The device is used by feeding solid particles to the vertical branch of the "L" so as to establish and maintain a cap or buffer height of solid particles in this vertical branch. The cap of solid particles is generally kept at a height that is higher than the height of the aeration gas injector, and the flow of solid particles is regulated by manipulating the aeration gas flow. Such a device generally is not completely satisfactory, for example, in an application to hydrocarbon catalytic reforming, because of the low flow rates of aeration gas that are used and because a slight variation of this flow rate can cause an abrupt variation of the catalyst flow rate. Furthermore, the aeration gas, in this type of device, has the tendency to rise to a certain height of the vertical portion of the "L"-shaped pipe and participates only to a lesser extent in dilution and acceleration of particles to the pneumatic transport.

U.S. Pat. No. 5,698,642 describes a gas-phase polymerization process in which the polymer particles, during expansion, circulate between a polymerization zone in which they are in a dense phase, and another polymerization zone in which they are subjected to a quick fluidization. In one of the embodiments of the above-mentioned patent, the passage between the two polymerization zones is made via an "L"-shaped valve and a pneumatic transport pipe. The "L" shape of the pipe, the injection point of the aeration gas, and the orientation of the injector of this device do not make it possible to obtain, a priori, good regulation of the flow of polymer particles during expansion for the same reasons already reported.

DESCRIPTION OF THE INVENTION

The applicant found a device for the transport of solid particles with a controlled flow rate, making it possible to improve significantly the regulation of the flow of solid particles.

More specifically, the invention relates to a device for the transport of granular solid particles with a controlled flow rate, comprising:

a) a pipe (A) for feeding granular solid particles in the dense phase, placed so that the particle flow is by gravity, b) downstream, a pneumatic transport pipe (C) that comprises means for introducing a primary gas so as to carry out the transport of these particles in the dilute phase, c) a transfer pipe (B) that connects, without a buffer space (or buffer capacity), the base of said feed pipe (A) to said pneumatic transport pipe (C), whereby this transfer pipe (B) is inclined relative to the vertical along a non-zero angle that is less than 90 degrees, for an upward circulation of the particles, and that comprises secondary-gas injection means, located approximately at the junction between feed pipe (A) and transfer pipe (B), with an injection direction forming an angle (non-zero) with the direction of particle flow in feed pipe (A) at its junction with transfer pipe (B), d) means for controlling the flow rate of secondary gas.

The means for controlling the flow rate of secondary gas comprise every means making it possible to vary this flow rate during the operation of the device, such as, in particular, a control valve, an orifice or a Venturi tube with means for regulating or controlling the upstream pressure, etc. Preferably, means are used that make it possible to know the effective flow rate of secondary gas, such as a flowmeter, and means for modulating this flow, such as a regulated control valve and/or means for regulating the feed pressure of the secondary gas.

In general, feed pipe (a), or its primary rectilinear part, is oriented with an angle that ranges from 0 to 40 degrees, and preferably from 0 to 30 degrees relative to the vertical, and can typically be vertical.

Feed pipe (A) preferably empties into the transfer pipe through an opening upon an abrupt change in direction. Typically, at least a portion of the injection means of the secondary gas is placed approximately opposite said opening. In general, the device comprises secondary-gas injection means, approximately opposite the opening, with an injection direction that is approximately opposite the direction of flow of particles in the feed pipe at this opening, forming with this direction of flow an angle of at least 120 degrees, preferably at least 140 degrees, very preferably at least 160 degrees. In particular, this angle advantageously can be 180 degrees, whereby the injection is done in counter-current to the particle flow.

The inclined transfer pipe typically comprises an essentially rectilinear primary portion that is joined downstream by an elbow to pneumatic transport pipe (C). The angle of the essentially rectilinear primary portion relative to the upward vertical is generally between 10 and 50 degrees, preferably between 15 and 35 degrees, and very preferably between 15 and 30 degrees, for example 30 degrees. It is possible to select, preferably, a fairly small angle (moderately inclined transfer pipe) to ensure that particles cannot stagnate on the walls. In particular, it is possible to select an angle that is less than the angle of repose of solid particles, i.e., the angle, measured relative to the downward vertical, from the top of the cone that is formed by a pile of particles.

This essentially rectilinear primary portion is preferably an expanding section in the direction of particle flow. In particular, it can consist of a total angular divergence of between, for example, 3 and 30 degrees, and preferably between 5 and 25 degrees.

The upper end of the essentially rectilinear primary portion can be connected to the pneumatic transport pipe via an elbowed portion. The radius of curvature of this elbowed portion is generally selected so as to limit the shock erosion phenomenon by solid particles on the inside wall of the pneumatic transport. It is possible, for example, to select a radius of curvature of between 2 and 15 diameters, preferably between 2.5 and 12 diameters, and very preferably between 3 and 10 diameters.

The ratio $D_A/D_B$ between the diameter, $D_A$, of feed pipe (A) and the mean diameter (in the middle of this rectilinear primary portion) $D_B$ of the rectilinear primary portion of transfer pipe (B) can generally be between 0.5 and 6, preferably between 0.6 and 2.5, and very preferably between 1 and 2, inclusive (and advantageously close to 1, or equal to 1). The ratio $D_A/D_C$ between diameter $D_A$ of feed pipe (A) and diameter $D_C$ of pneumatic transport pipe (C) can generally be between 0.5 and 6, preferably between 0.6 and 2.5, and very preferably between 0.7 and 2, inclusive (for example close to 1, or equal to 1). When the section of these pipes or pipe portions are not circular, it is possible to replace the value of the diameter by that of the equivalent hydraulic diameter.

Pneumatic transport pipe (C) can optionally be inclined, along an angle that generally ranges from 0 to 40 degrees, preferably from 0 to 30 degrees, and very preferably from 0 to 20 degrees relative to the upward vertical. It is advantageously oriented vertically. The pneumatic transport pipe can also be elbowed.

Typically, the secondary-gas injection means comprise orifices, or slots, or nozzles, or Venturi tubes, optionally fed with secondary gas via a chamber, and are generally located at several levels of the transfer pipe. The chamber optionally can be placed inside transfer pipe (B).

In an embodiment of the invention, transfer pipe (B) comprises an orifice plate attached inside the lowest portion of this pipe (B), placed so as to make a separation between, in its upper portion, the lowest portion of the flow zone of solid particles, and, in its lower portion, a chamber that is fed with the secondary gas. The orifice plate is preferably mounted in an inclined manner and comprises perforated zones that are placed at different heights of said plate. This plate can extend into the rectilinear portion of the intake pipe by an extension that does not comprise orifices, optionally essentially up to the pneumatic transport pipe.

Advantageously, at least a portion of the secondary-gas injection means (or the sole means) is placed essentially at the bottom of the flow zone of solid particles, for example below or essentially opposite the opening for which feed pipe (A) empties into transfer pipe (B).

The invention also relates to a process for transport of granular solid particles with a controlled flow rate, in which:
the solid particles are continuously brought by a feed pipe (A), according to a dense-phase gravity flow, to an inclined transfer pipe (B),
a secondary gas is injected into the inclined transfer pipe, essentially at the junction of feed pipe (A) with transfer pipe (B), to accelerate the solid particles in the transfer pipe in an upward direction, preferably essentially linear, to a pneumatic transport pipe (C),
a primary gas is introduced into the pneumatic transport pipe for transporting the solid particles in the dilute phase.

It is then possible to control the flow rate of solid particles by manipulating the secondary gas flow.

The invention also relates to the use of the device that is described above or a similar device that could be used by one skilled in the art starting from the invention for the transport of catalyst from one chamber to the next, in particular in a unit for catalytic reforming of hydrocarbons.

This use leads in particular to a reduction in the sensitivity of the flow of solid particles to the flow of secondary gas, as will be shown below, making possible a better control of the solid flow during the transport of catalyst from one chamber to another, in particular in a unit for catalytic reforming of hydrocarbons.

The primary and secondary gases are generally, in the case of catalytic reforming, a gas that is high in hydrogen, or nitrogen, or a mixture that comprises nitrogen and/or hydrogen and/or hydrocarbons.

The solid particles can have any shape, for example an essentially cylindrical shape, or preferably an essentially spherical shape, a diameter (or equivalent diameter of the sphere having the same volume as the particle, for a non-spherical particle) of between 0.8 to 8 millimeters, often between 1 and 3 millimeters, for example from about 2 millimeters, and a particle density that can range in general from 700 to 1200 kg/m3. The ratio between the diameter (or mean diameter, or equivalent hydraulic diameter) of the transfer pipe and the mean diameter of the particles is generally between 10 and 300 and preferably between 20 and 100.

To obtain the pneumatic transport of particles, the driving force of the gas is used whose speed may be higher than 4 m/s, preferably between 4 and 15 m/s, and very preferably between 5 and 10 n/s. The gas whose driving force is used is generally, according to the invention, essentially the sum of the primary gas and the secondary gas. The volumetric solid fraction in the pneumatic transport can generally range from 0.5% to 20%, and most often from 1% to 10% relative to the total volume of gas+solid.

The flow zone in the dense phase generally corresponds to a zone in which the volumetric fraction of solid can typically range from 40% to 70%, relative to the volume of this zone.

The flow zone in the dense phase can extend over a height (of feed pipe (A)) that is generally significant enough essentially to prevent the secondary gas from flowing in counter-current relative to the solid particles. This height is generally at least 2×, preferably at least 10×, and even more preferably at least 20× the equivalent diameter of pipe (A) in this flow zone.

The flow rate of secondary gas that is injected at the outlet of the flow zone in the dense phase can typically range from 1 to 50%, preferably 2 to 40%, and more preferably from 3 to 30% of the sum of the flow rate of primary gas and the flow rate of the secondary gas. Generally, the flow rate of secondary gas can range from 0.01 to 0.5 kg/h per kg of transported solid particles, for example 0.04 kg/h per kg of transported solid particles.

According to another aspect of the process according to the invention, the secondary gas is injected so as to accelerate the particles in an upward linear direction to the pneumatic transport. Thus, the secondary gas and its mode of injection make it possible not only to prevent a local accumulation of particles at the root of the flow zone in the dense phase, but also to entrain the solid particles in a generally upward direction of flow, facilitating the final entrainment of the particles into pneumatic transport pipe (C). The acceleration that is undergone by the solid particles is generally reflected by a progressive reduction of the volumetric fraction of solid between the flow zone in the dense phase and the pneumatic transport.

For better comprehension, the device of the invention is illustrated by figures that do not exhibit a limiting nature.

Figure 1:
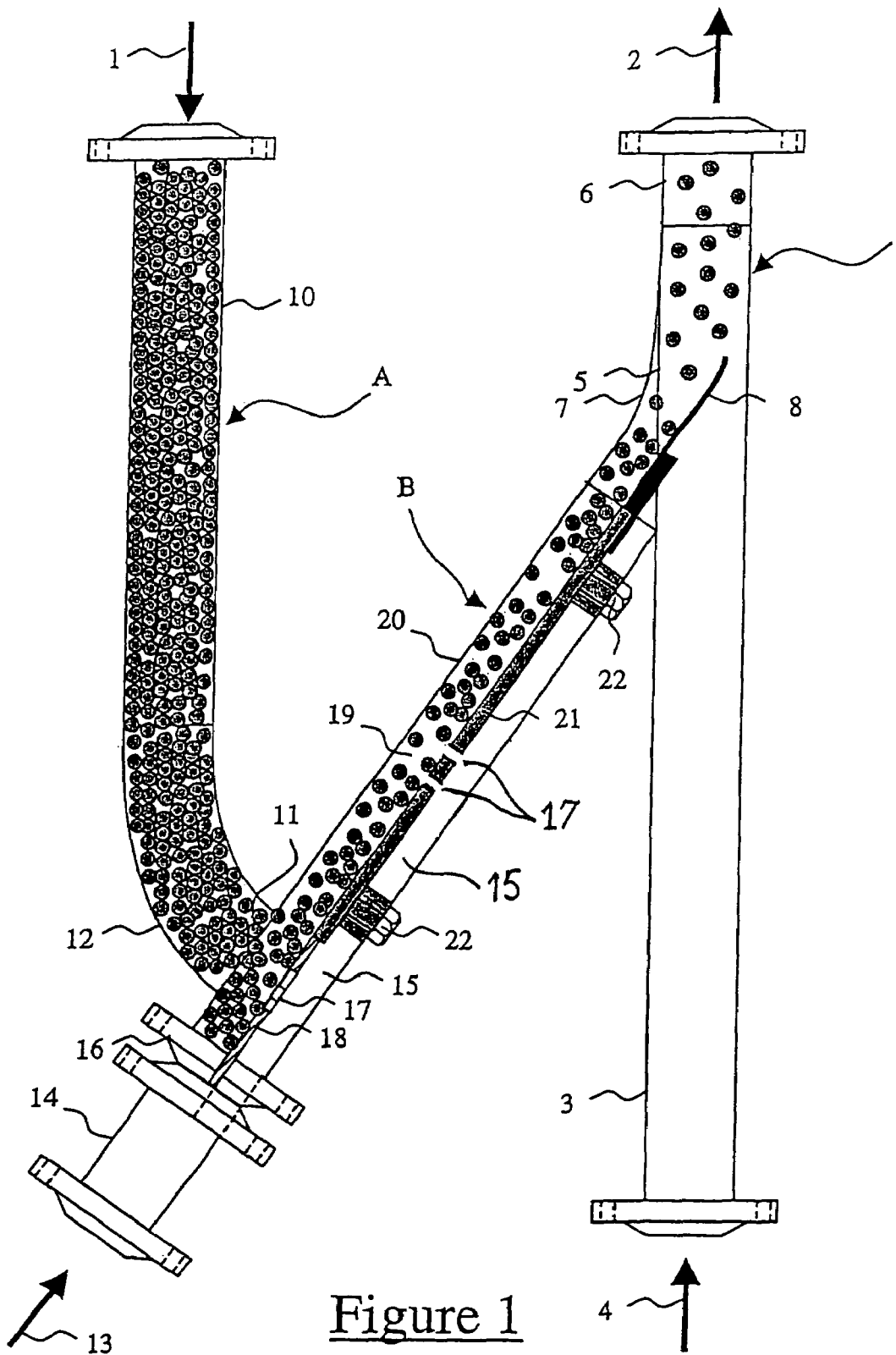
FIG. 1 represents an embodiment of a device according to this invention, particularly suited for an implementation on a test-bed, as described in the example provided below.

The device that is shown in FIG. 1 comprises a pipe (A) for supplying solid particles that empties into a transfer pipe (B) that is connected to a pneumatic transport pipe (C).

The granular solid particles, symbolized by small gray-tinted circles, are fed in the dense phase in pipe (A) by a gravity flow in a downward direction 1, then are directed via transfer pipe (B) into a pneumatic transport pipe (C), where they are transported in an upward direction 2, in the dilute state. Pneumatic transport pipe (C) comprises a feed pipe 3 of primary gas 4, an opening 5 for supplying solid at its junction with transfer pipe (B), and a pipe 6 for the pneumatic transport, which is only partially shown. The pneumatic transport of solid particles is possible thanks to the driving force that is generated by the primary gas that is introduced by gas feed 4 into pipe 3. This primary gas encounters the particles that are obtained from intake pipe (A), via transfer pipe (B), which come in through solid feed mouth 5 at the outlet of a terminal elbowed portion 7 of this transfer pipe (B). An extension 8 makes it possible to guide the solid particles in an upward direction and locally to reduce the passage section of the primary gas into pneumatic transport pipe (C) to increase locally the speed of the gas and to better accelerate the particles.

We now follow the progression of the particles: The solid particles are first of all directed via feed pipe (A). This pipe (A) comprises a portion of vertical pipe 10, connected to an elbow 12 that is provided with an opening 11, at the low part, at the junction and the outlet of this pipe (A) into transfer pipe (B). The solid particles that are shown in vertical pipe 10 are in a flow zone in the dense phase or an accumulation zone. This zone typically extends essentially through opening 11 where the particles encounter a secondary gas that is obtained from gas feed 13. The secondary gas goes through a pipe 14 then feeds a chamber 15 that is devoid of solids. Pipe 14 is attached to transfer pipe (B) thanks to a flange 16 whose opening is blocked in its upper portion. The secondary gas flows into the lower portion of the opening of flange 16, feeds chamber 15, and goes through orifices 17 located at several levels of a perforated plate 18 that is mounted in transfer pipe (B). Perforated plate 18 extends, in its lower portion, up to the opening of the flange so as to separate the particle flow zone that is located above from secondary-gas feed chamber 15 that is devoid of solids and is located below. Perforated plate 18 and chamber 15 thus constitute the secondary-gas injection means of the device of FIG. 1 according to the invention.

The injection of secondary gas is thus carried out at the bottom of the particle flow zone in a direction that is primarily in counter-current relative to the direction of particle flow in the dense phase coming from pipe (A) at opening 11.

By definition, it is considered according to the invention that the flow direction of the particles is the one that corresponds to the direction of pipe (A) at its end, i.e., by taking the direction of the median axis of pipe (A) to its end (here at the end of elbow 12, at opening 11). As far as the injection direction of the secondary gas is concerned, the latter is, for a nozzle or a Venturi tube, that of the median axis of this nozzle or this Venturi tube. For a perforated plate, or a slotted plate, the direction is defined as that of the perpendicular with this perforated plate.

The particles are then accelerated by the secondary gas in a space 19 that is delimited by a rectilinear primary portion 20 of transfer pipe (B) that comprises an extension 21 of perforated plate 18 in an upward linear direction. Plate 18 and its extension 21 are held with two screws 22 that make it possible to immobilize them inside intake pipe A, with crosspieces, not referenced. Extension 8, described above, is attached to extension 21 of perforated plate 18.

The device of FIG. 1 does not comprise, contrary to the "lift pots" of the prior art, space or buffer capacity on the path of particles that pass through feed pipe (A), then transfer pipe (B), and then pneumatic transport pipe (C).

Figure 2:
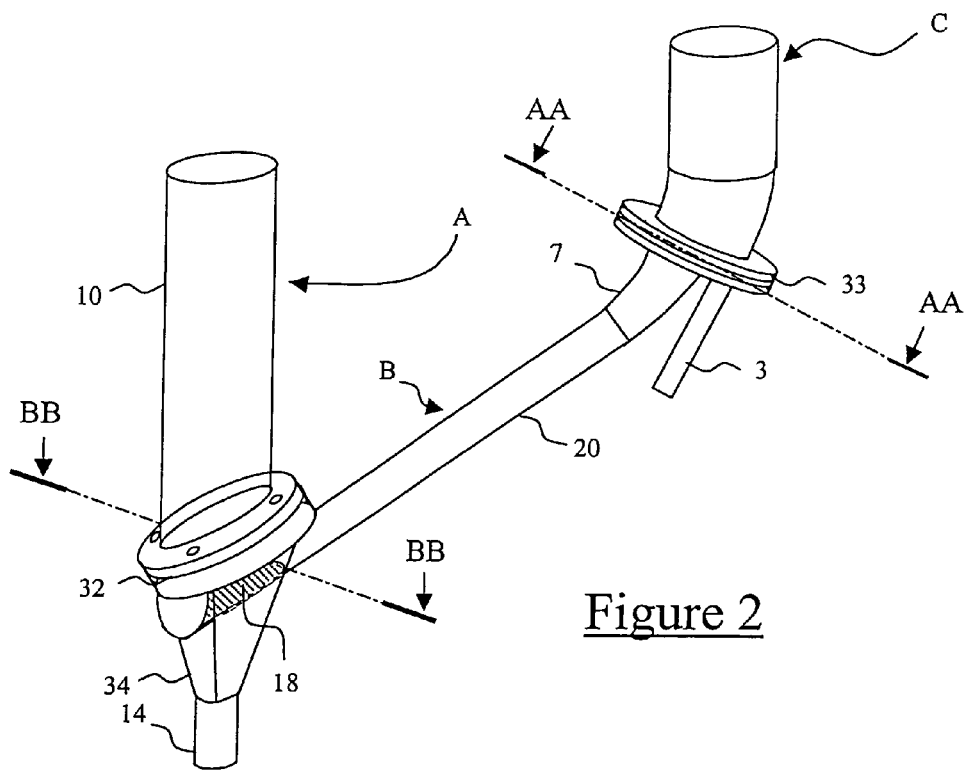
FIG. 2 represents another embodiment of a device according to the invention.

FIG. 2 represents another embodiment of a device according to the invention in which there is found a certain number of elements of FIG. 1, with the same references. The solid particles, not shown, descend by gravity into vertical rectilinear pipe 10, which ends by an inclined flange 32, and are transported, via a transfer pipe (B), into a pneumatic transport pipe (C) in the dilute phase, thanks primarily to the driving force of a primary gas that is fed via pipe 3. The secondary gas, circulating in pipe 14, passes through a section transformation zone 34 that forms a diffuser and that partially constitutes the jacket of the secondary-gas feed chamber. An element of sheet metal 18 that comprises perforations (orifices) forms the upper portion of the chamber and allows injection of secondary gas at the bottom of the particle circulation zone in the device. Transfer pipe (B) comprises, in addition to this secondary-gas injection zone, a rectilinear tubular portion 20, an elbow 7, and is attached via a flange 33 to pneumatic transport pipe (C).

Figure 2A:
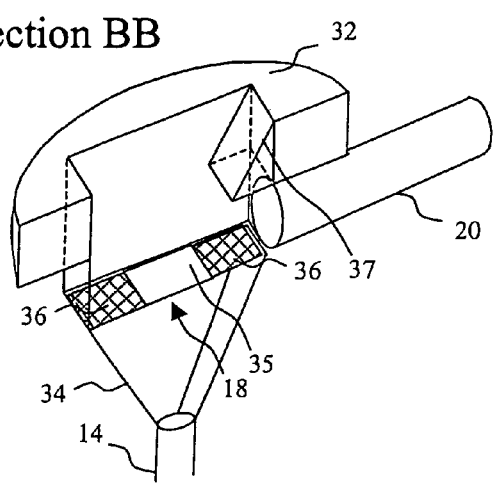
FIGS. 2A and 2B each represent an embodiment of a portion of the device of FIG. 2.

FIG. 2A corresponds to fraction BB, located in FIG. 2, perspective view. Flange 32, diffuser 34, perforated element 18 and rectilinear portion 20 of intake pipe A are found. Element of sheet metal 18 that comprises perforations exhibits one perforated zone 35 and two non-perforated zones 36, hatched in the figure. A deflector 37 is added at flange 32 to better direct the solid particles to perforated zone 35. Another deflector, not shown, is advantageously placed opposite the first, on the other side of the flange.

Figure 2B:
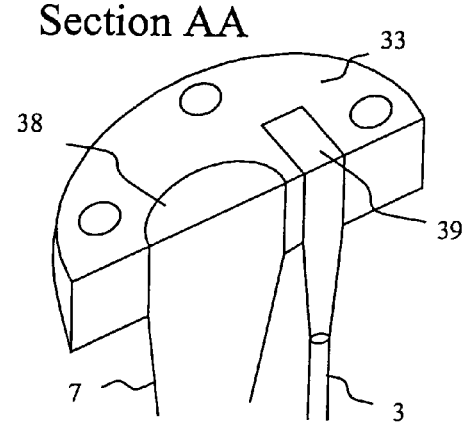

FIG. 2B corresponds to fraction AA, located in FIG. 2, perspective view. Elbowed portion 7 empties into flange 33 that uses a first opening 38 to supply the pneumatic transport pipe with solid particles. In parallel, a primary gas feed pipe 3 empties into flange 33 via a separate opening 39.

Figure 3:
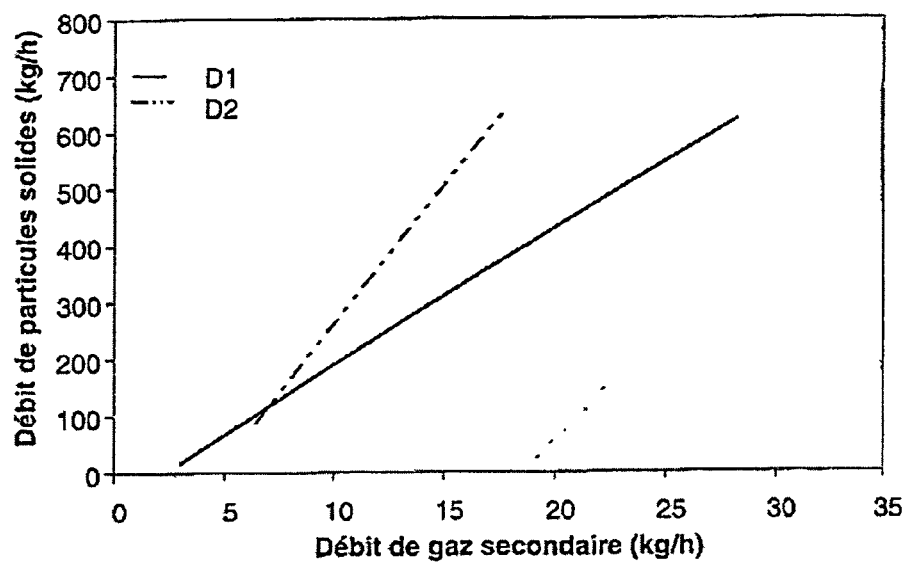
FIG. 3 is a graphic representation illustrating the compared evolution of the flow rate of solid particles based on the flow rate of secondary gas, for a conventional device, and for a device according to the invention.

FIG. 3 is a graphic representation, given by way of example, illustrating the evolution of the flow of solid particles based on the secondary-gas flow for two different configurations of a device, one according to the invention and the other not according to the invention. These configurations are illustrated in a more detailed manner in the examples below.

EXAMPLES

Two devices that exhibit different configurations were used on a test-bed so as to measure the evolution of the flow rate of solid particles based on the flow rate of secondary gas and to determine the best embodiment for the regulation of the flow rate of solid particles.

The two devices A1 and A2 are produced on the basis of the embodiment exhibited in FIG. 1, with differences for A2, explained below, whereby these differences are linked to the position of the secondary-gas injection means and the flow direction of this gas.

Device A1 is exactly as shown in FIG. 1. A1 thus exhibits a transfer pipe (very inclined) whose angle relative to the upward vertical is 30 degrees, and secondary-gas injection means that comprise orifices mounted on the base of the flow zone in the dense phase opposite the opening of the feed portion. The secondary gas injection is therefore done in a direction that is essentially in counter-current relative to the flow direction of the particles in the dense phase, therefore with an angle of 180 degrees relative to this flow direction.

Device A2, not in accordance with the invention, exhibits differences relative to A1:

First of all, the injection means of A2 are not mounted opposite opening 11 of the feed portion as is the case in A1. In this case, these injection means are orifices that are located at the opening of the flange that attaches feed pipe (A) to transfer pipe (B). On the other hand, the orifices are placed such that the secondary-gas injection is done in a direction that is essentially co-current relative to the flow direction of the particles in the dense phase, therefore with a zero angle relative to the flow direction of the particles at the end of pipe (A).

The test-bed makes it possible to adopt the two configurations A1 and A2 by changing the elements. It comprises a hopper for gravity-feeding of solid particles, which are small alumina balls of 2 mm in diameter, whereby this hopper is connected to a portion of feed pipe (A) of the device being studied. The test-bed also comprises means to supply air from a pressurized air network. The secondary air flow is regulated with a control valve with different values in a range that goes from 0 to 35 kg/h. For each regulation of the secondary air flow, the primary air flow is set at a value such that the sum of the primary and secondary air flows is kept constant, in this case equal to 130 kg/h. For each of these regulations, the solid particle flow is measured by pressure difference between two points of the pneumatic transport pipe. A preliminary calibration actually showed that the solid particle flow is linearly correlated with the pressure drop between these two points. A series of measurements is carried out for each of devices A1 and A2. The evolution of the solid particle flow based on the secondary-air flow for each of devices A1 and A2 was thus shown graphically in FIG. 3. It is noteworthy that device A1, exhibiting air injection means placed opposite the opening by which the feed pipe empties out from the feed portion of the intake pipe, with an air injection direction that makes an angle with the flow direction of the particles, made it possible to obtain a curve whose slope is about 2×smaller than that of the curve that is obtained for device A2. This small slope that is observed with device A1 indicates that the regulation of the solid particle flow is significantly improved because a variation of any origin in the secondary air flow does not translate into an excessive variation of the solid flow.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding French application No. 03/10.026, filed Aug. 19, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device for the transport of granular solid particles with a controlled flow rate, comprising:
    a) a substantially rectilinear pipe (A) having an angle to the vertical of 0–40° for feeding granular solid particles in the dense phase, placed so that the particle flow is by gravity,
    b) downstream, a pneumatic transport pipe (C) comprising means (3, 4) for introducing a primary gas so as to carry out the transport of said particles in the dilute phase,
    c) a transfer pipe (B) having a substantially rectilinear primary portion (20) that connects without a buffer space the base of said feed pipe (A) to said pneumatic transport pipe (C), whereby said transfer pipe (B) forms a junction with feed pipe (A) and is inclined relative to the vertical along a non-zero angle of less than 90 degrees, for an upward circulation of the particles, said transfer pipe (B) comprising secondary-gas injection means (17, 18, 35), located approximately at the junction between feed pipe (A) and transfer pipe (B), with an injection direction means forming an angle of at least 120° with the axis at the bottom end of the feed pipe (A) at said junction with transfer pipe (B), and d) means for controlling the flow rate of secondary gas.

2. A device according to claim 1, wherein said feed pipe empties into said transfer pipe via an opening (11) upon an abrupt change in direction.

3. A device according to claim 2, wherein at least a portion of means (17, 18, 35) for injection of a secondary gas are placed approximately in front of said opening (11).

4. A device according to claim 3, said means (17, 18, 35) comprising secondary-gas injection means, approximately in front of said opening (11), with said injection direction means, said forming with said axis at the bottom end of said feed pipe (A) an angle of at least 140 degrees.

5. A device according to claim 1, wherein inclined transfer pipe (B)
comprises said substantially rectilinear primary portion (20) attached downstream by an elbow (7) to said pneumatic transport pipe (C).

6. A device according to claim 5, wherein the angle of the substantially rectilinear primary portion (20) relative to the vertical is between 10 and 50 degrees.

7. A device according to claim 5, wherein said substantially rectilinear primary portion (20) has an expanding section in the upward end thereof.

8. A device according to claim 4, wherein the upper end of the substantially rectilinear portion is connected to the pneumatic transport pipe via an elbowed portion.

9. A device according to claim 1, wherein the means for injection of secondary gas comprise orifices or nozzles 17, located at several levels of the transfer pipe and a chamber 15, outside said transfer pipe (B), in communication with said orifices or nozzles.

10. A device according to claim 2, in which at least a portion of the secondary-gas injection means is placed approximately at the bottom of the flow zone of the solid particles, below or approximately opposite opening (11) via which feed pipe (A) empties into transfer pipe (B).

11. A device according to claim 1, wherein said transfer pipe (B) further comprises a chamber extending along the length of said transfer pipe for holding and feeding secondary gas.

12. A device according to claim 9, wherein said transfer pipe (B) further comprises a chamber extending along the length of said transfer pipe for holding and feeding secondary gas.

13. A device according to claim 1, wherein said injection direction means forms an angle of at least 140° C. with the axis at the bottom end of the feed pipe (A).

14. A device according to claim 1, wherein said injection direction means forms an angle of at least 160° C. with the axis at the bottom end of the feed pipe (A).

15. A device according to claim 1, wherein said injection direction means forms an angle of at least 180° C. with the axis at the bottom end of the feed pipe (A).

16. A device according to claim 14, wherein the angle to the vertical of pipe (A) is 0–30°.

17. A device according to claim 16, wherein pipe (A) is vertical.

18. A device according to claim 14, wherein pipe (B) is inclined relative to the vertical at an angle between 10° and 50°.

19. A device according to claim 16, wherein pipe (B) is inclined relative to the vertical at an angle between 10° and 50°.

20. A device according to claim 1, wherein said substantially rectilinear portion (20) is substantially coextensive with the entire transfer pipe (B).

21. A device according to claim 1, wherein said pipe (B) extends continuously upwardly to the connection with the pneumatic transport pipe (C).

* * * * *

UNITED STATES PATENT AND TRADEMARK OFFICE
CERTIFICATE OF CORRECTION

| | | |
|---|---|---|
| PATENT NO. | : 7,021,870 B2 | Page 1 of 1 |
| APPLICATION NO. | : 10/921300 | |
| DATED | : April 4, 2006 | |
| INVENTOR(S) | : Damien Gille et al. | |

It is certified that error appears in the above-identified patent and that said Letters Patent is hereby corrected as shown below:

On the Title page, item [73] Assignee: line 1, reads "Institute" should read -- Institut --

Signed and Sealed this

Twenty-seventh Day of February, 2007

JON W. DUDAS
*Director of the United States Patent and Trademark Office*